United States Patent [19]

Lee et al.

[11] Patent Number: 4,509,238
[45] Date of Patent: Apr. 9, 1985

[54] METHOD FOR FABRICATING A STEAM TURBINE DIAPHRAGM

[75] Inventors: Lester H. Lee, Braintree; Kathryn M. Johnson, Salem; Richard W. Jones, Melrose, all of Mass.

[73] Assignee: General Electric Company, Lynn, Mass.

[21] Appl. No.: 477,345

[22] Filed: Mar. 21, 1983

[51] Int. Cl.³ .............................................. B21K 3/04
[52] U.S. Cl. ..................... 29/156.8 R; 29/156.8 CF; 29/DIG. 13; 29/DIG. 26; 29/DIG. 48; 29/416; 415/185; 416/213 A; 416/189; 416/194; 416/195; 219/69 M; 219/121 EK; 219/121 LJ
[58] Field of Search ......... 29/416, 156.8 CF, 156.8 R, 29/DIG. 13, DIG. 26, DIG. 48; 415/185, 190; 416/213 R, 213 A, 189 R, 194 R, 195; 219/69 M, 69 W, 121 EH, 121 EK, 121 LJ

[56] References Cited

U.S. PATENT DOCUMENTS

| 1,470,499 | 10/1923 | Steenstrup | 29/156.8 R |
| 1,470,502 | 10/1923 | Steenstrup | 29/156.8 R |
| 1,470,507 | 10/1923 | Steenstrup | 29/156.8 R |
| 1,938,382 | 12/1933 | Haigh | 29/156.8 R |
| 2,264,877 | 12/1941 | Haigh | 29/156.8 R |
| 2,299,449 | 10/1942 | Allen | 29/156.8 R |
| 2,373,558 | 4/1945 | Haigh | 29/156.8 R |
| 3,532,437 | 10/1970 | Strub | 415/185 X |
| 3,564,188 | 2/1971 | Dathe | 219/69 W |
| 3,802,046 | 4/1974 | Wachtell et al. | 219/69 M |
| 4,288,677 | 9/1981 | Sakata et al. | 416/213 R X |

FOREIGN PATENT DOCUMENTS 672789   3/1939   Fed. Rep. of Germany ...... 416/195

Primary Examiner—Charlie T. Moon
Assistant Examiner—Ronald S. Wallace
Attorney, Agent, or Firm—James W. Mitchell

[57] ABSTRACT

Blades in the steam path of a steam turbine diaphragm are assembled into slots in full circular bands and are structurally bonded thereto by welding. After stress relief, the bands are each separated into two 180 degree pieces by line cuts which pass between adjacent blades. The bands are then welded to semicircular rings having planar mating surfaces. The welding of the rings to the bands is performed with minimum welding without concern for whether the welds enter the interface sufficiently far to contact the blades themselves.

2 Claims, 6 Drawing Figures

METHOD FOR FABRICATING A STEAM TURBINE DIAPHRAGM

BACKGROUND OF THE INVENTION

The present invention relates to steam turbines and, more particularly, to diaphragms containing blades which direct and accelerate steam for impingement on buckets of a steam turbine.

A steam turbine conventionally employs nozzles formed by a plurality of stationary blades in the steam path which are aerodynamically shaped to receive the steam, smoothly turn it in a desired direction and accelerate it for impingement on turbine buckets. Precision in the steam path is critical to turbine efficiency. The steam must be precisely directed using diaphragm blades which are accurately figured and stably supported to avoid power wasting turbulence or off-design flow characteristics.

A diaphragm of a steam turbine is conventionally formed by inserting opposed ends of blades into cutouts in semi-circular bands known as spacers. The ends of the blades are tack welded to the spacers and outer and inner semi-circular rings are penetration welded to the spacers and to the blades. In order to obtain satisfactory attachment of the blades to the rings, very deep welding is necessary between the rings and spacers so that the weld penetrates far enough in this interface to also contact and attach the blades.

As noted in U.S. Pat. No. 4,288,677, welding defects increase as the weld depth increases. Such welding defects may include, for example, cracks, slag inclusions, lack of complete penetration, etc., which may lead to failure or instability of the nozzle blades. Furthermore, such deep welding tends to distort and to thereby deviate the steam path from the design aerodynamic characteristics and thus produce reduced overall efficiency of the apparatus.

The spacers have typically been relatively thin such as, for example, less than one-quarter inch, since this thickness was the maximum which conventional punching techniques could accommodate. Due to this thinness, the spacers themselves were effective more as positioning agents prior to welding to the inner and outer rings rather than structural members capable of supporting the blades on their own.

A further source of distortion arose due to the fabrication of spacers and blades into semi-circular assemblies. Distortions due to heating and weld shrinkage, material stress relief and tempering tended to distort this subassembly both prior to, and during, mating with the inner and outer semi-circular rings. This distortion could be traced at least in part to the fact that changing stresses in a semi-circular assembly can result in distortion of the semi-circle.

Conventional fabrication techniques have employed a radial mating plane for mating the two halves of the diaphragm. This has customarily required cutting a nozzle blade at each end of each of the semi-circular assemblies due to the overlap of the nozzle blades in the tangential direction. This resulted in relatively flexible blade portions in the steam path which could distort and vibrate to reduce steam flow aerodynamic efficiency.

OBJECTS OF THE INVENTION

It is an object of the invention to provide a steam turbine diaphragm which overcomes the drawbacks of the prior art.

It is a further object of the invention to provide a steam turbine diaphragm having improved aerodynamic nozzles.

It is a further object of the invention to provide a steam turbine diaphragm in which the nozzle blades are structurally affixed to bands while the bands are in a full 360° configuration so that distortion due to assembly deviations, thermal and shrinkage stresses are minimized and tighter tolerances can be held.

It is a further object of the invention to provide a diaphragm for a steam turbine in which the separation between 180° sectors of the steam path is made on a cutting line between adjacent blades.

It is a further object of the invention to provide a steam turbine diaphragm in which bands at the ends of the blades are cut in a curving path between adjacent blades and mating surfaces of inner and outer rings are planar.

According to an aspect of the present invention, there is provided a 180 degree half diaphragm for a turbine, comprising a steam path including an inner semi-circular band, an outer semi-circular band concentric with the inner semi-circular band and a plurality of blades between the inner and outer semicircular bands, inner and outer ends of the blades fitting into slots in the inner and outer bands, structural welds affixing the inner and outer ends of the blades to the inner and outer semi-circular bands, an inner semi-circular ring affixed to an inner surface of the inner semi-circular band by welds at upstream and downstream interfaces thereof, an outer semi-circular ring affixed to an outer surface of the outer semi-circular band by welds at upstream and downstream ends thereof, and the inner and outer bands and the structural welds being effective for supporting the blades without requiring welding between the blades and the inner and outer rings.

According to a feature of the present invention, there is provided a method for making a steam path for a steam turbine diaphragm, comprising forming a 360 degree inner band, forming a 360 degree outer band, cutting a plurality of slots in the inner and outer bands to accept inner and outer ends of blades, coaxially clamping the inner and outer bands, inserting a plurality of the blades into the plurality of slots, tack welding the inner and outer ends to the inner and outer bands, structurally welding the inner and outer ends to the inner and outer bands in a welding sequence effective to minimize distortion of the steam path, stress relieving and tempering the steam path, and cutting the inner and outer bands at two locations approximately 180 degrees apart using first and second cutting lines spaced between adjacent blades.

According to a further feature of the present invention, there is provided a method for making a turbine diaphragm, comprising forming a 360 degree inner band, forming a 360 degree outer band, cutting a plurality of slots in the inner and outer bands to accept inner and outer ends of blades, coaxially clamping the inner and outer bands, inserting a plurality of the blades into the plurality of slots, tack welding the inner and outer ends to the inner and outer bands, structurally welding the inner and outer ends of the blades to the inner and outer bands in a welding sequence effective to minimize distortion of a steam path, stress relieving and tempering the steam path, cutting the inner and outer bands at two locations 180 degrees apart using first and second cutting lines spaced between adjacent blades to form first and second steam path halves, forming a pair of 180 degree inner half rings, each having generally planar mating surfaces at ends thereof, affixing the pair of inner half rings to the inner bands of the steam path halves with welds at upstream and downstream interfaces thereof, forming a pair of 180 degree outer half rings each having generally planar mating surfaces at ends thereof, and affixing the pair of outer half rings to the outer band of the steam path halves with welds at upstream and downstream interfaces thereof.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
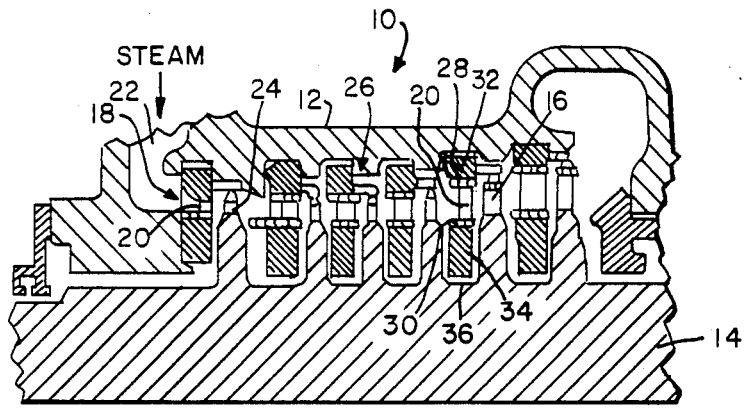
FIG. 1 shows an axial cross section of a typical steam turbine.

Referring now to FIG. 1, a cross section is shown of an axial flow steam turbine 10 which includes a casing 12 and a rotatable shaft 14. A plurality of turbine buckets 16 are affixed in a conventional manner to shaft 14 for rotation therewith. An inlet diaphragm 18 includes an annular row of blades 20 which accelerate and direct incoming steam from a steam chest 22 onto a first row 24 of turbine buckets.

Additional diaphragms 26 are disposed between pairs of subsequent stages of turbine buckets 16 for redirecting and accelerating the steam emerging from the upstream stage and impinging it at optimum angle and speed on the respective downstream stage.

Each diaphragm 26 includes blades 20 between an outer spacer 28 and an inner spacer 30. An outer ring 32 is affixed to outer spacer 28 and mates in a conventional manner with casing 12. An inner ring 34 is affixed to inner spacer 30 and is suspended spaced from shaft 14. As is conventional, a shaft seal (not shown) may be employed in a seal region 36 at an inner extremity of inner ring 34 to permit shaft 14 to rotate with respect to diaphragm 26 while sealing against axial steam leakage along the rotating shaft.

Figure 2:
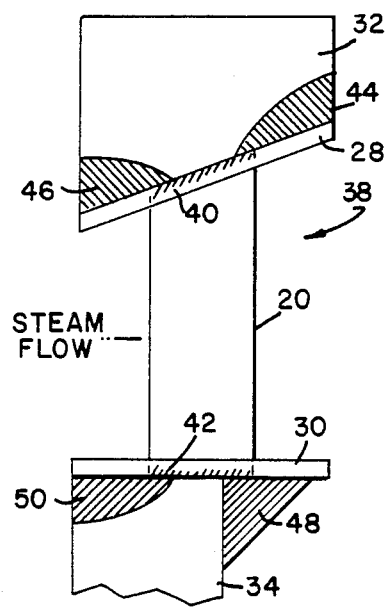
FIG. 2 shows an enlarged cross sectional view of a portion of a diaphragm of a steam turbine according to the prior art.

Referring now to FIG. 2, there is shown an axial cross section of a diaphragm fabricated according to the teaching of the prior art. Blade 20 is initially tack welded to outer spacer 28 and to inner spacer 30. Subsequently, blades 20 are seal welded to the outer and inner bands at respective locations 40 and 42. This holds semi-circular outer and inner spacers 28 and 30 and blades 20 in a semi-circular assembly which is then welded by deep penetration welds 44, 46, 48 and 50 to outer and inner semi-circular rings 32 and 34. It should be noted that each of welds 44 - 50 penetrates deeply enough into the interface between spacer and ring to contact and firmly affix ends of blade 20 to rings 32 and 34. That is, spacers 28 and 30 are employed principally for positioning blade 20 until blade 20 is rigidly attached by welding to outer and inner rings 32 and 34 which thereupon become the structural support for blade 20.

Figure 3:
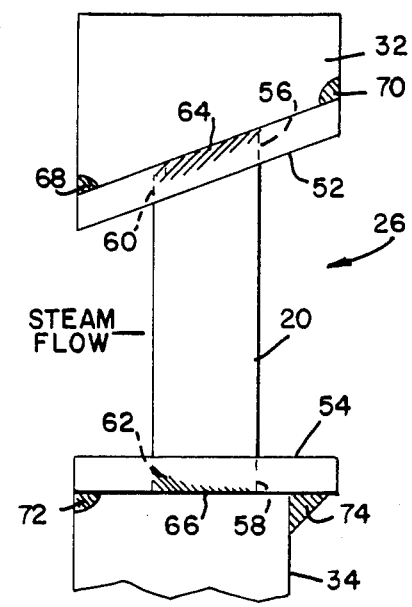
FIG. 3 is an enlarged cross section of a portion of a diaphragm of a steam turbine according to the present invention.

Referring now to FIG. 3, there is shown a cross section of a diaphragm according to the present invention wherein outer and inner bands 52 and 54 respectively include slots 56 and 58 into which are fitted ends 60 and 62 of blade 20. Ends 60 and 62 are firmly welded as indicated at 64 and 66 to outer and inner bands 52 and 54 respectively prior to assembly with outer and inner rings 32 and 34. As will be explained hereinafter, welds 64 and 66 are completed while bands 52 and 54 are in a full annular 360 degree configuration. Bands 52 and 54 are thick enough and strong enough to provide full structural support for blade 20 without requiring direct welding to outer and inner rings 32 and 34. Consequently, outer band 52 is welded to outer ring 32 employing a minimum amount of welding 68 and 70 which need not contact end 60 of blade 20, but instead, merely needs to firmly affix the upstream and downstream ends of band 52 to ring 32. Similarly, minimum welds 72 and 74 are employed to affix upstream and downstream ends of band 54 to inner ring 34 without the need for contact of weld 72 or 74 with end 62 of blade 20.

In some circumstances, outer band 52 may diverge as shown to permit expansion of steam.

Figure 4:
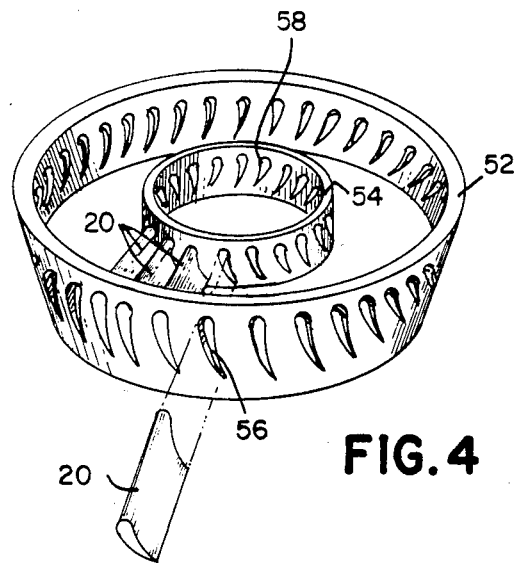
FIG. 4 is a perspective view showing a step in the assembly of a steam path of a diaphragm.

Referring now to FIG. 4, the pre-assembly consisting of inner and outer bands 54 and 52 with blades 20 is shown. Inner and outer bands 54 and 52 are formed by bending strips into hoops, appropriately welding the opposed ends of each strip together, and stress relieving and tempering expanding the hoops in a conventional manner to yield the 360 degree annular structures as shown. Slots 56 in outer band 52 and slots 58 in inner band 54 are formed in any convenient manner such as by electrode discharge machining but, in the preferred embodiment, slots 56 and 58 are formed by laser cutting. Either of these cutting methods is satisfactory for forming slots in relatively thick material as is required in the present invention since outer and inner bands 52 and 54 provide a substantial part of the support for blades 20.

Outer and inner bands 52 and 54 are securely clamped in correct coaxial relative positions on a surface (not shown) and blades 20 are installed by, for example, sliding them through slots 56 in outer band 52 into slots 58 in inner band 54. In one embodiment of the invention, slots 56 and 58 pass completely through their respective bands 52 and 54. It will be clear to one skilled in the art that one or the other of slots 56 or 58 may be blind holes formed, for example, by electrode discharge machining and that the other may be completely through the material of its band. When the full complement of blades 20 are installed to form a 360 degree assembly, blades 20 are positioned welded to bands 52 and 54. Such welding is preferably controlled to minimize the application of heat to inner and outer bands 54 and 52 as well as to blades 20 in order to minimize thermal distortion at this stage.

Figure 5:
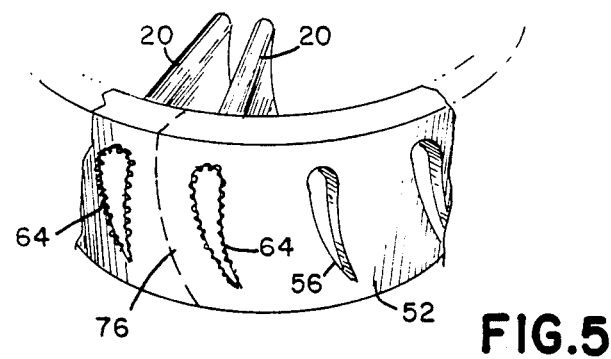
FIG. 5 is a closeup of a portion of a steam path of FIG. 4.

Referring now also to FIG. 5, following tack welding, structural penetration welding employing, for example, gas tungsten arc welding and/or gas metal arc welding processes are employed to produce welds 64 and 66 (not shown) which structurally unite blades 20 with inner and outer bands 54 and 52 while such bands are still in their full 360 degree configuration. The sequence of welding may be selected so that distortion from the welding is minimized. For example, welds may be made in opposed pairs on opposite sides of the structure so that distortions will be offset and reduced. By retaining inner and outer bands 54 and 52 in their full 360 degree configuration during this time, advantage can be taken of the natural geometric rigidity in the bands to distribute forces generated by thermal distortion and thereby to maintain the steam paths in the nozzles formed by adjacent blades within designed parameters.

After all blades 20 are securely welded at both ends, the resulting assembly is stress relieved and tempered using conventional protective atmospheric heat treating techniques to remove residual stresses which may remain in the assembly upon the completion of welding and to temper the weld heat affected zone. Following stress relief, inner and outer bands 54 and 52 are severed by two cuts disposed 180 degrees apart along cutting line paths between adjacent blades 20. For example, a curving cut such as shown in dashed line 76 in FIG. 5 may be employed to separate the assembly into two 180 degree pieces. Other cuts such as straight lines, or a series of connected straight lines may be used as blade arrangements dictate. The removal of material in making curving cut 76 is preferably held to a minimum so that, when the ends are later mated in the turbine, an insignificant departure from a circle is achieved. Curving cut 76 may be performed, for example, using conventional traveling wire electrical discharge machining which may remove, for example, 0.012 inches of material. This amount of material is insignificant when compared to the radius of the diaphragm. Separately prepared 180 degree sectors of outer ring 32 and inner ring 34 (FIG. 3) are then assembled to the 180 degree steam path previously described and minimum welds 68-74 are employed to affix outer band 52 to outer ring 32 and inner band 54 to inner ring 34.

Figure 6:
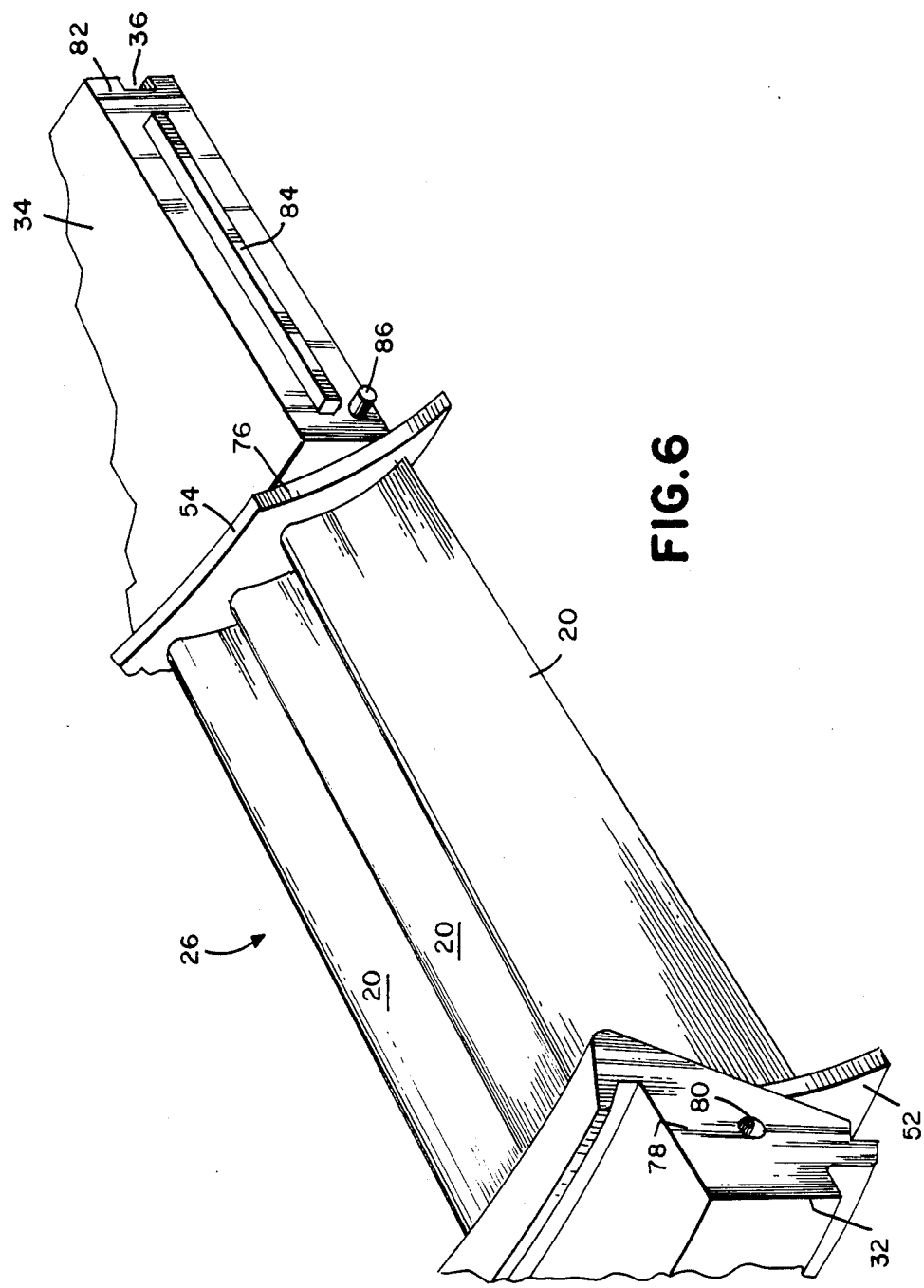
FIG. 6 is an enlarged view of a mating region of one of the semi-circular portions of an assembled diaphragm according to the present invention.

Referring now to FIG. 6, the mating surfaces of one of the assembled halves of a diaphragm is shown. It will be noted that a plane radial mating surface 78 is provided on outer ring 32 for abutment with a corresponding plane radial surface on its opposite member. A dowel hole 80 may be employed for positioning and holding the mating outer ring which is provided with a projecting dowel (not shown).

A plane radial mating surface 82 is provided on inner ring 34 for mating with a corresponding surface on its mating member. As is conventional, a tenon 84 may be formed to project from mating surface 82 and to engage a mortise (not shown) in the mating surface. A locating dowel 86 may also be provided for aiding guidance during assembly by fitting into a dowel hole (not shown) in the mating surface. It should be noted that curving cut 76 is both curved and is inclined with respect to a plane of diaphragm 26 whereas mating surfaces 78 and 82 are radial planes whose projections preferably intersect the axis. By employing curving cut 76, all blades 20 may remain in one piece rather than being separated into two portions by an axial cut which would be necessary if the separation of inner and outer bands 54 and 52 were made planar and parallel to mating surfaces 78 and 82. The planar nature of mating surfaces 78 and 82 aids in positioning and mating of the two 180 degree portions.

A diaphragm 26 according to the present invention therefore, minimizes and controls distortion due to stresses induced during production by distributing such stresses employing the natural geometric rigidity in the 360 degree inner and outer bands 54 and 52 while forming the steam path and by employing minimum welds for affixing the bands to the rings. Curving cuts 76 between adjacent blades 20 eliminates turbulence due to poorly supported part blade segments. Since structural support of blades 20 is provided by inner and outer bands 54 and 52, attachment of inner and outer bands 54 and 52 to inner and outer rings 34 and 32 is performed at their interfaces using a minimum amount of welding without concern for whether the welding depth is great enough to actually reach the ends of the blades themselves.

Although a diaphragm according to the present invention does not require direct welding between rings 32 and/or 34 and blades 20, this should not be taken to exclude overlapping welds. In some diaphragms, blades 20 are positioned so close to the upstream or downstream end of the diaphragm that they are directly contacted by even a minimum weld at the interface of bands and rings. Such incidental contact should not be taken to remove such a diaphragm from the scope of the invention.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for making a turbine diaphragm comprising the steps of:
   forming two 360 degree bands of different diameters;
   cutting a plurality of slots in each of the bands for accepting opposite ends of blades;
   placing the bands into concentric alignment with one another to define an inner and outer band and welding inner and outer blade ends each into respective inner and outer band slots;
   severing both said inner and outer bands at two locations approximately 180 degrees apart using first and second line cuts spaced between adjacent blades;
   forming a pair of 180 degree inner and outer half rings, each ring having generally planar mating surfaces at opposite ends; and,
   welding the pair of inner and outer half rings to the inner and outer bands respectively whereby the line cuts between adjacent blades and the planar mating surfaces of inner and outer half rings at each location are not aligned in the same radial plane.

2. A method according to claim 1, wherein the severing step between blades includes cutting a curved surface between adjacent blades to form first and second steam path halves.

* * * * *